US011462106B2

United States Patent
Lang

(10) Patent No.: US 11,462,106 B2
(45) Date of Patent: Oct. 4, 2022

(54) ROAD SCREEN NETWORKING SYSTEM AND VEHICLE-MOUNTED UNIT

(71) Applicants: Ordos Yuansheng Optoelectronics Co., Ltd., Inner Mongolia (CN); BOE Technology Group Co., Ltd., Beijing (CN)

(72) Inventor: Yue Lang, Beijing (CN)

(73) Assignees: ORDOS YUANSHENG OPTOELECTRONICS CO., LTD., Inner Mongolia (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 44 days.

(21) Appl. No.: 16/765,622

(22) PCT Filed: Dec. 16, 2019

(86) PCT No.: PCT/CN2019/125660
§ 371 (c)(1),
(2) Date: May 20, 2020

(87) PCT Pub. No.: WO2020/151405
PCT Pub. Date: Jul. 30, 2020

(65) Prior Publication Data
US 2021/0201675 A1    Jul. 1, 2021

(30) Foreign Application Priority Data
Jan. 22, 2019    (CN) .......................... 201910059227.6

(51) Int. Cl.
*G08G 1/0962*     (2006.01)
*B60Q 9/00*     (2006.01)
(Continued)

(52) U.S. Cl.
CPC ........ *G08G 1/09623* (2013.01); *B60Q 9/008* (2013.01); *G08G 1/0112* (2013.01); *G08G 1/096791* (2013.01); *G08G 1/163* (2013.01)

(58) Field of Classification Search
CPC ............ G08G 1/09623; G08G 1/0112; G08G 1/096791; G08G 1/163; G08G 1/166; B60Q 9/008; H04L 67/12; G08B 21/24
(Continued)

(56) References Cited

U.S. PATENT DOCUMENTS 7,010,397 B1 * 3/2006 Pfleging ........... G08G 1/096725
340/691.6
8,880,237 B2 * 11/2014 Boss ................. G08G 1/096775
701/1
(Continued)

FOREIGN PATENT DOCUMENTS

| CN | 103325148 A | 9/2013 |
| CN | 104778840 A | 7/2015 |

(Continued)

OTHER PUBLICATIONS

Office Action dated Apr. 9, 2020, issued in counterpart CN Application No. 201910059227.6, with English Translation. (21 pages).

*Primary Examiner* — Omer S Khan
(74) *Attorney, Agent, or Firm* — WHDA, LLP

(57) ABSTRACT

The present disclosure relates to a road screen networking system and a vehicle-mounted unit. The road screen networking system includes a plurality of road screen units; wherein each road screen unit is configured to acquire information of vehicles driving within its communication range and to provide the information to vehicles within the communication range; and wherein the communication range of each road screen unit is a range between the road screen unit and a next road screen unit in a driving direction.

8 Claims, 6 Drawing Sheets

(51) Int. Cl.
*G08G 1/01* (2006.01)
*G08G 1/0967* (2006.01)
*G08G 1/16* (2006.01)

(58) Field of Classification Search
USPC ........................................................ 340/905
See application file for complete search history.

(56) References Cited

U.S. PATENT DOCUMENTS

| | | | |
|---|---|---|---|
| 9,767,687 B2 | 9/2017 | Gupta et al. | |
| 10,140,861 B2 | 11/2018 | Gupta et al. | |
| 10,401,869 B2 | 9/2019 | Yi et al. | |
| 10,565,870 B2 | 2/2020 | Gupta et al. | |
| 2013/0038461 A1* | 2/2013 | Hawkes .................. | E01F 9/559 340/815.4 |
| 2014/0195068 A1* | 7/2014 | Boss ....................... | G16Z 99/00 701/1 |
| 2017/0076599 A1 | 3/2017 | Gupta et al. | |
| 2017/0345299 A1 | 11/2017 | Gupta et al. | |
| 2017/0369055 A1* | 12/2017 | Saigusa ........... | B60W 30/18163 |
| 2018/0196444 A1 | 7/2018 | Yi et al. | |
| 2019/0088122 A1 | 3/2019 | Gupta et al. | |
| 2020/0160702 A1 | 5/2020 | Gupta et al. | |
| 2020/0307580 A1* | 10/2020 | Kobayashi ............ | B60W 30/09 |

FOREIGN PATENT DOCUMENTS

| | | |
|---|---|---|
| CN | 104778851 A | 7/2015 |
| CN | 106297348 A | 1/2017 |
| CN | 106448263 A | 2/2017 |
| CN | 107921968 A | 4/2018 |
| CN | 108281024 A | 7/2018 |
| CN | 109686126 A | 4/2019 |
| JP | 2006309736 A | 11/2006 |
| JP | 2009090718 A | 4/2009 |

* cited by examiner

ROAD SCREEN NETWORKING SYSTEM AND VEHICLE-MOUNTED UNIT

CROSS-REFERENCE TO RELATED APPLICATION(S)

The present disclosure claims priority to Chinese patent application No. 201910059227.6, filed on Jan. 22, 2019, and titled "Road screen networking system and vehicle-mounted unit", the entire disclosure of which is incorporated herein by reference.

TECHNICAL FIELD

The present disclosure relates to the field of control technology, and in particular to a road screen networking system and a vehicle-mounted unit.

BACKGROUND

At present, in the driving process, the driver is required to visually recognize the information on the vehicle in front in many scenarios. When the vehicle enters a curve or mountain road, the driver's line of sight will be blocked, and the driver needs to decelerate or stop to confirm the information, in order to ensure driving safety. However, deceleration and stopping will cause trouble to the vehicles in the rear, and it is easy to cause traffic accidents such as vehicle rear-end collision.

SUMMARY

The present disclosure provides a road screen networking system and a vehicle-mounted unit to solve the problem in the prior art that the front vehicle information acquired by the driver is insufficient due to limited visibility.

According to a first aspect of the embodiments of the present disclosure, there is provided a road screen networking system, comprising a plurality of road screen units; wherein each road screen unit is configured to acquire information of vehicles within its communication range and to provide the information to vehicles within the communication range; and wherein the communication range of each road screen unit is a range between the road screen unit and a next road screen unit in a driving direction.

Optionally, each road screen unit comprises: a data acquisition module, a data processing module, and a data transmitting module.

The data acquisition module is configured to acquire, when a vehicle enters the communication range of a current road screen unit, characteristic data of the vehicle and a speed of the vehicle. The characteristic data comprises vehicle characteristic information or an identification code.

The data processing module is configured to generate the identification code of the vehicle when there is no identification code in the characteristic data, and to update road information and generate alarm information according to the speeds of individual vehicles within the communication range of the current road screen unit. The road information comprises at least relative distances between vehicles within the communication range of the current road screen unit.

The data transmitting module is configured to transmit the identification code and the speed of the vehicle to the vehicle, and to transmit the road information to vehicle-mounted units within the communication range of the current road screen unit.

Optionally, the data processing module is configured to update road information and generate alarm information according to the speeds of individual vehicles within the communication range of the current road screen unit by operations comprising:

calculating, for each vehicle within the communication range of the current road screen unit, a distance between the vehicle and an end point of the communication range of the current road screen unit according to the speed of the vehicle and a time point when the speed of the vehicle is acquired;

determining, based on the distance, whether it is abnormal that the vehicle has not passed the end point of the communication range of the current road screen unit; and generating the alarm information in a case of abnormality.

Optionally, the road screen unit further comprises a display module, and the display module is configured to display the road information.

Optionally, the data acquisition module comprises a data collecting sub-module and a data receiving sub-module.

The data collecting sub-module is configured to acquire the characteristic data of the vehicle and the speed of the vehicle.

The data receiving sub-module is configured to receive the identification code and the speed of the vehicle sent by the vehicle-mounted unit, which is installed inside a vehicle entering into the communication range of the current road screen unit from the communication range of a previous road screen unit in the driving direction.

Optionally, the data receiving sub-module overrides the data collecting sub-module in acquiring the characteristic data of the vehicle and the speed of the vehicle.

Optionally, the data transmitting module is further configured to transmit a vehicle passing identification to the data receiving sub-module of a previous and/or next road screen unit in the driving direction when a vehicle passes the starting point of the communication range of the current road screen unit.

Optionally, if the vehicle passing identification transmitted by the data transmitting module of the next road screen unit in the driving direction is received, the vehicle corresponding to the vehicle passing identification is considered to have passed an end point of the communication range of the current road screen unit.

Optionally, a current road screen unit communicates with a next road screen unit in the driving direction, and communicates, when the next road screen unit fails, with a road screen unit following the next road screen unit in the driving direction, until a normal road screen unit is found as the next road screen unit of the current road screen unit.

Optionally, the road information further comprises road conditions within the communication range of the current road screen unit.

According to a second aspect of the embodiments of the present disclosure, there is provided a vehicle-mounted unit installed on a vehicle and comprising a data transmitting module and a data receiving module;

wherein the data transmitting module is configured to transmit an identification code and a speed of the vehicle stored by the vehicle to a road screen unit; and wherein the data receiving module is configured to receive the speed and identification code of the vehicle and road information from the road screen unit.

Optionally, the vehicle-mounted unit further comprises a display module configured to display the road information.

According to a second aspect of the embodiments of the present disclosure, there is provided an operating method of a road screen networking system comprising a plurality of road screen units; a communication range of each road screen unit being a range between the road screen unit and a next road screen unit in a driving direction, the operating method comprising:

acquiring, when a vehicle enters the communication range of a current road screen unit, an identification code of the vehicle and a speed of the vehicle;

updating road information and generating alarm information according to the speeds of individual vehicles within the communication range of the current road screen unit, the road information comprising at least relative distances between vehicles within the communication range of the current road screen unit; and transmitting the identification code and the speed of the vehicle to the vehicle, and transmitting the road information to vehicle-mounted units within the communication range of the current road screen unit.

Optionally, acquiring the characteristic data of the vehicle comprises:

acquiring characteristic data of the vehicle, and generating the identification code according to the characteristic data of the vehicle.

Optionally, updating road information and generating alarm information according to the speeds of individual vehicles within the communication range of the current road screen unit comprises:

calculating, for each vehicle within the communication range of the current road screen unit, a distance between the vehicle and an end point of the communication range of the current road screen unit according to the speed of the vehicle and a time point when the speed of the vehicle is acquired;

determining, based on the distance, whether it is abnormal that the vehicle has not passed the end point of the communication range of the current road screen unit; and generating the alarm information in a case of abnormality.

Optionally, the operating method of a road screen networking system further comprises: displaying the road information on a display module.

Optionally, the operating method of a road screen networking system further comprises:

transmitting a vehicle passing identification to a previous and/or next road screen unit in the driving direction when a vehicle passes a starting point of the communication range of the current road screen unit.

It can be seen that in this embodiment, each road screen unit may acquire information of vehicles within its respective communication ranges, and then provide the information to the drivers of the vehicles by displaying the information on the display module of the road screen unit or transmitting it to the vehicle-mounted modules installed on the vehicles. It can improve the driver's ability to obtain vehicle information, avoid troubles caused by vehicle deceleration and emergency stop, and can reduce the risk of accidents.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with the present disclosure, and are used together with the specification to explain the principles of the present disclosure.

DETAILED DESCRIPTION

Figure 1:
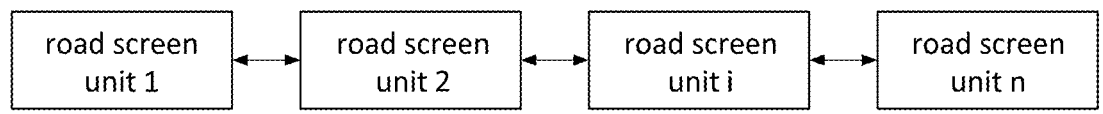
FIG. 1 is a block diagram of a road screen networking system according to an embodiment of the present disclosure.

Exemplary embodiments will be described in detail here, examples of which are shown in the drawings. When referring to the accompanying drawings, unless otherwise indicated, the same numerals in different drawings represent the same or similar elements. The embodiments described in the following exemplary embodiments do not represent all embodiments consistent with the present disclosure. Rather, they are merely examples of devices and methods consistent with some aspects of the present disclosure as detailed in the appended claims.

At present, in the driving process, the driver is required to visually recognize the information of the vehicle in front many scenarios. When the vehicle enters a curve or mountain road, the driver's line of sight will be blocked, and the driver needs to decelerate or stop to confirm the information, in order to ensure driving safety. However, deceleration and stopping will cause trouble to the vehicles in the rear, and it is easy to cause traffic accidents such as vehicle rear-end collision.

To this end, an embodiment of the present disclosure provides a road screen networking system. FIG. 1 is a block diagram of a road screen networking system according to an embodiment of the present disclosure. Referring to FIG. 1, a road screen networking system includes a plurality of road screen units, for example, road screen unit 1, road screen unit 2, . . . , road screen unit i, . . . , road screen unit n.

Each road screen unit is configured to acquire information of vehicles within its communication range and provide the information to the drivers of the vehicles within the communication range.

The communication range of each road screen unit is the range between each road screen unit and the next road screen unit in the driving direction.

Figure 2:
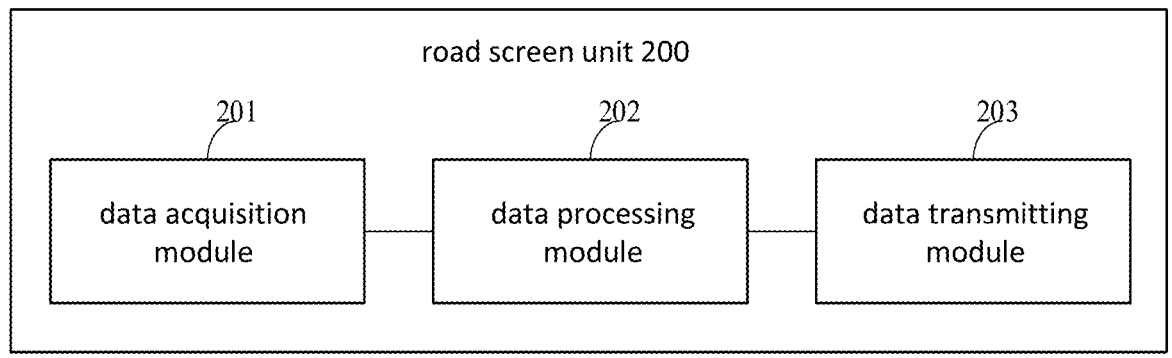
FIG. 2 is a block diagram of a road screen unit according to an embodiment of the present disclosure.

In an embodiment, referring to FIG. 2, each road screen unit 200 includes a data acquisition module 201, a data processing module 202 and a data transmitting module 203. The data acquisition module 201 and the data processing module 202 are communicatively connected. The data acquisition module 201 may acquire the characteristic data of the vehicle and the speed of the vehicle when the vehicle enters the communication range of the current road screen unit, and transmit the acquired characteristic data of the vehicle and the speed of the vehicle to the data processing module.

The data processing module 202 is also connected to the data transmitting module 203. The data processing module 202 is configured to generate the identification code of the vehicle when there is no identification code in the characteristic data of the vehicle, and to update, according to the speeds of individual vehicles within the communication range of the current road screen unit, road information and generate alarm information, and to transmit the identification code, the speed of the vehicle and the road information to the data transmitting module 203. The road information includes at least the relative distance(s) between the vehicles within the communication range of the current road screen unit.

For example, the data processing module 202 may acquire the speed of each vehicle and the time point when the speed of the vehicle is acquired. The data processing module 202 may calculate, using the speed of each vehicle and the time point, the distance between each vehicle within the communication range of the current road screen unit and the end point of the communication range of the current road screen unit, and may then determine, based on the distance, whether it is abnormal that the vehicle has not passed the end point of the communication range of the current road screen unit. For example, when it is calculated that each vehicle within the communication range of the current road screen unit should be within the communication range of the current road screen unit, it is considered as normal that the vehicle has not passed the end point of the communication range. For another example, when it is calculated that a certain vehicle within the communication range of the current road screen unit should have passed the end point of the communication range of the current road screen unit, it is considered as abnormal that the vehicle has not passed the end point of the communication range. The data processing module 202 may generate alarm information in an abnormal situation. For example, the alarm information reminds each vehicle within the communication range of the current road screen unit of the abnormal situation and the vehicle to which the abnormality occurs, or the location where the abnormal vehicle may be located.

The data transmitting module 203 is configured to transmit the identification code and the speed of the vehicle to the vehicle entering the communication range of the current road screen unit, and transmit the updated road information to the vehicle-mounted unit(s) within the communication range of the current road screen unit. The vehicle-mounted unit of the vehicle entering the communication range of the current road screen unit stores the speed of the vehicle and the identification code. The vehicle-mounted unit within the communication range of the current road screen unit may display the road information when the updated road information is received.

In this way, in this embodiment, the road screen unit 200 may transmit the road information to the vehicle-mounted unit, which is displayed by the vehicle-mounted unit to inform the driver of the vehicle.

Figure 3:
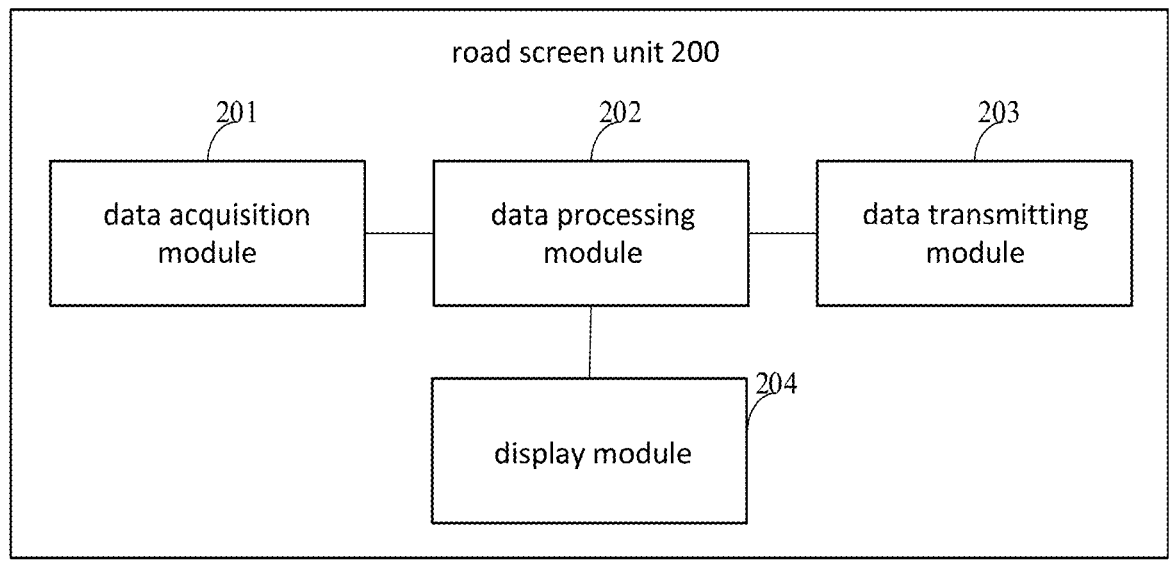
FIG. 3 is a block diagram of another road screen unit according to an embodiment of the present disclosure.

In another embodiment, referring to FIG. 3, the road screen unit may further include a display module 204. The display module 204 may be connected to the data processing module 202 for displaying the road information.

In this way, in this embodiment, the road screen unit 200 may directly display the road information through the display module 204, so that the driver on each vehicle within its communication range is capable of directly seeing it, which can prevent the driver from looking down at the vehicle-mounted unit and ensure driving safety.

In an example, considering that each road screen unit has a different installation position on the road, for example, the first road screen unit and other road screen units following the first road screen unit in the driving direction, there may be different ways of acquiring data. When the vehicle has just entered the starting point of the communication range of the first road screen unit, the identification code is not stored in the vehicle-mounted unit in the vehicle at this time, so that the first road screen unit may acquire the characteristic data of the vehicle and then generate the identification code.

Figure 4:
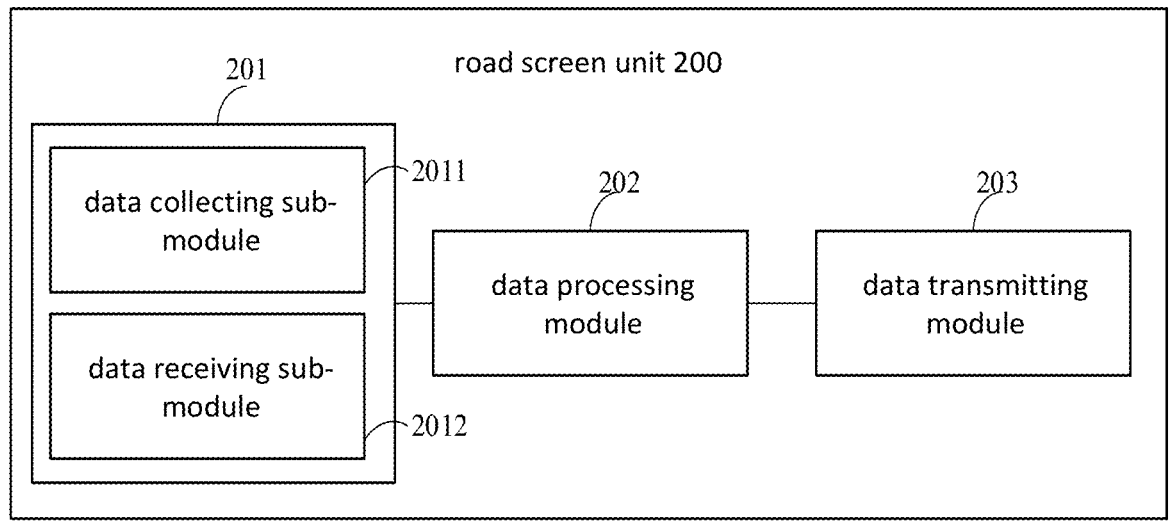
FIG. 4 is a block diagram of still another road screen unit according to an embodiment of the present disclosure.

In this example, referring to FIG. 4, the data acquisition module 201 may include a data collecting sub-module 2011. The data collecting sub-module 2011 may acquire the characteristic data of the vehicle and the speed of the vehicle. The data collecting sub-module 2011 may be implemented by a webcam, a camera, a lidar system or an ultrasonic device, and the like. Those skilled in the art may choose different hardware to implement the data collecting sub-module, as long as the vehicle's characteristic data and speed can be acquired, and the corresponding solution falls within the protection scope of the present disclosure.

It will be understood that the characteristic data of the vehicle may include the characteristics such as the license plate number, vehicle shape, color, logo, and the like, which are distinguished from other vehicles. Those skilled in the art may choose any specific characteristic data according to the specific scenario as long as each vehicle can be distinguished from other vehicles, and the corresponding solution falls within the protection scope of the present disclosure.

It will be understood that the identification code may be the license plate number of the vehicle, or a combination of at least one of a set of numbers, letters, and characters. Those skilled in the art may choose any appropriate identification code according to the specific scenario as long as each vehicle can be distinguished from other vehicles, and the corresponding solution falls within the protection scope of the present disclosure.

It will be understood that the algorithm for generating the identification code based on the vehicle characteristic information may be preset (for example, a license plate number recognition algorithm), and may also be customized by the manager of the system, such as "vehicle color+vehicle type+the number of the vehicle in all vehicles driving into the communication range+the number of the vehicle in all vehicles currently within the communication range". Those skilled in the art may choose any appropriate generation algorithm according to the specific scenario as long as each identification code that uniquely identifies each vehicle can be generated, and the corresponding scheme falls within the scope of protection of the present disclosure.

In another example, when the vehicle passes the communication range of the first road screen unit, that is, when the vehicle has just passed the starting point of the communication range of the second road screen unit, since the first road screen unit has generated the identification code of the vehicle and the identification code has been stored in the vehicle-mounted unit of the vehicle, the second road screen unit may directly acquire the identification code of the vehicle.

In this example, again referring to FIG. 4, the data acquisition module 201 may include a data receiving sub-module 2012. The data receiving sub-module 2012 may receive the identification code and speed of the vehicle transmitted from the vehicle-mounted unit of the vehicle which enters the current communication range from the communication range of the previous road screen unit in the driving direction. The data receiving sub-module 2012 may communicate with the vehicle-mounted unit in a wireless mode. The wireless mode may be at least one of Bluetooth, ZigBee, and WiFi. Of course, those skilled in the art may choose different hardware to implement the data receiving sub-module, and the corresponding solution falls within the protection scope of the present disclosure.

In yet another example, the data acquisition sub-module may include both the data collecting sub-module 2011 and the data receiving sub-module 2012. In some scenarios, the installer may determine whether the data collecting sub-module 2011 or the data receiving sub-module 2012 acquires data according to the installation location of the road screen unit. For example, for the first road screen unit in the road screen networking system, the data collecting sub-module 2011 collects data; for another example, for the second or following road screen unit in the road screen networking system, the data receiving sub-module 2011 receives data. In other scenarios, the data receiving sub-module 2012 may be set to override the data collecting sub-module 2011. That is, both the data receiving sub-module 2012 and the data collecting sub-module 2011 operate. If the data collecting sub-module 2011 collects data while the data receiving sub-module 2012 receives data at the same time, the data collected by the data collecting sub-module 2011 is discarded without further processing, and if the data receiving sub-module 2012 does not receive data at the same time, the data collected by the data collecting sub-module 2011 is used, such as the characteristic data of the vehicle and the speed of the vehicle. When the vehicle-mounted unit receives the identification code and the speed of the vehicle in case that the identification code and the speed of the vehicle have been already stored, it is updated with the newly received identification code and vehicle. In this way, even if the vehicle-mounted unit has stored the identification code and speed of the vehicle, in the case where the vehicle-mounted unit on the vehicle and the road screen unit cannot effectively communicate with each other when the vehicle passes the road screen unit and thus the stored identification code and speed of the vehicle cannot be sent to the passing road screen unit, the data processing module of the passing road screen unit regenerates the identification code for the vehicle and acquires the speed of the vehicle, and uses the newly generated identification code within the communication range of the passing road screen unit. In other scenarios, the priority of the data receiving sub-module 2012 may be set lower than the priority of the data collecting sub-module 2011. For example, for a road screen unit installed at a curve road, the vehicle usually changes its speed when passing the curve road. Therefore, setting the priority of the data receiving sub-module 2012 to be lower than the priority of the data collecting sub-module 2011 may update the speed of the vehicle in real time.

In an embodiment, considering that the road screen unit will always calculate the position of a vehicle within the communication range of the current road screen unit after the vehicle passing the starting point of the communication range, the vehicle needs to be excluded from the communication range of the road screen unit after the vehicle drives out of the communication range of the road screen unit. In this embodiment, the data transmitting module 203 is further configured to transmit a vehicle passing identification to the data receiving sub-module of the previous and/or next road screen unit in the driving direction when a vehicle passes the starting point of the communication range of the current road screen unit.

For example, when a vehicle passes the starting point of the communication range of the second road screen unit, the data transmitting module 203 of the second road screen unit transmits a vehicle passing identification to the data receiving sub-module of the first road screen unit, so that the first road screen unit may delete data such as the identification code of the vehicle, the speed of the vehicle, the time passing the starting point of the communication range, and the like, after receiving the vehicle passing identification.

For another example, when a vehicle passes the starting point of the communication range of the second road screen unit, the data transmitting module 203 of the second road screen unit transmits a vehicle passing identification to the data receiving sub-module of the third road screen unit, so that the third road screen unit may determine the starting point of its own communication range as the end point of the communication range of the second road screen unit after receiving the vehicle passing identification.

In this embodiment, when it is calculated that a certain vehicle within the communication range of the current road screen unit should have passed the end point of the communication range of the current road screen unit, it is considered abnormal that the vehicle has not passed the end point of the communication range. The data processing module 202 may generate alarm information under abnormal conditions. When the current road screen unit calculates that a certain vehicle within the communication range of the current road screen unit should have passed the end point of the communication range of the current road screen unit but has not received a vehicle passing identification for the vehicle from the next road screen unit, in addition to generating alarm information, the current road screen unit may also determine whether the next road screen unit fails by communicating with the next road screen unit. When the next road screen unit fails, the current road screen unit may communicate with the road screen unit following the next road screen unit in sequence until a normal road screen unit is found as the next road screen unit of the current road screen unit, and expand the communication range of the current road screen unit to the range from the current road screen unit to the next road screen unit that is operating normally. This can ensure that all road screen units in the road screen networking system operate normally, and exclude the faulty road screen unit.

For example, when a vehicle passes the starting point of the communication range of the second road screen unit, the data transmitting module 203 of the second road screen unit sends a message to the data receiving sub-module of the third road screen unit. If the response information of the third road screen unit is not received within a set period, it means that the third road screen unit has failed. At this time, the second road screen unit sends a message to the fourth road screen unit, so that the fourth road screen unit that transmits the response information replaces the third road screen unit to communicate with the second road screen unit, thereby achieving the effect that the third road screen unit is excluded from the road screen networking system.

According to an embodiment of the present disclosure, the road information further includes road conditions within the communication range of the current road screen unit, for example, a real scene of the road within the communication range, whether there is road maintenance, and the like. For example, the real scene of the road and the vehicles on the road are displayed on the display module of the road screen unit, so that the driver of the vehicle can intuitively know the situation of the road ahead.

Figure 5:
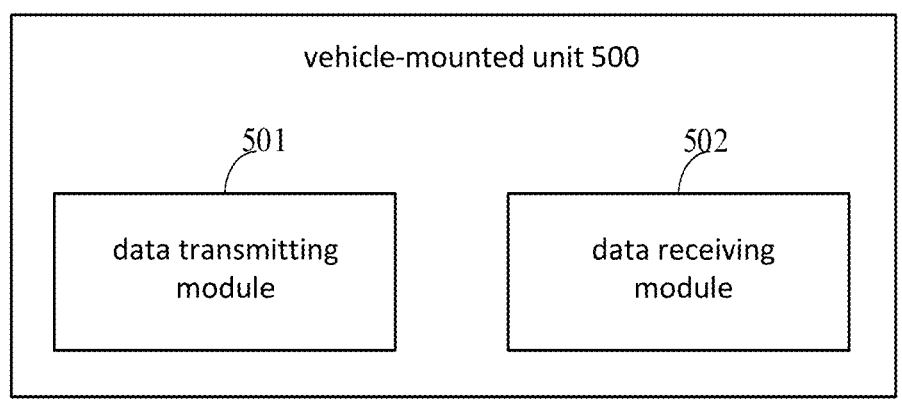
FIG. 5 is a block diagram of a vehicle-mounted unit according to an embodiment of the present disclosure.

An embodiment of the present disclosure also provides a vehicle-mounted unit. FIG. 5 is a block diagram of a vehicle-mounted unit according to an embodiment of the present disclosure. Referring to FIG. 5, a vehicle-mounted unit 500 is provided on a vehicle, and includes a data transmitting module 501 and a data receiving module 502. The data transmitting module 501 is configured to transmit the identification code and speed of the vehicle stored in the vehicle.

The data receiving module 502 is configured to receive the speed and identification code of the vehicle on which it is located and road information from the road screen unit.

Figure 6:
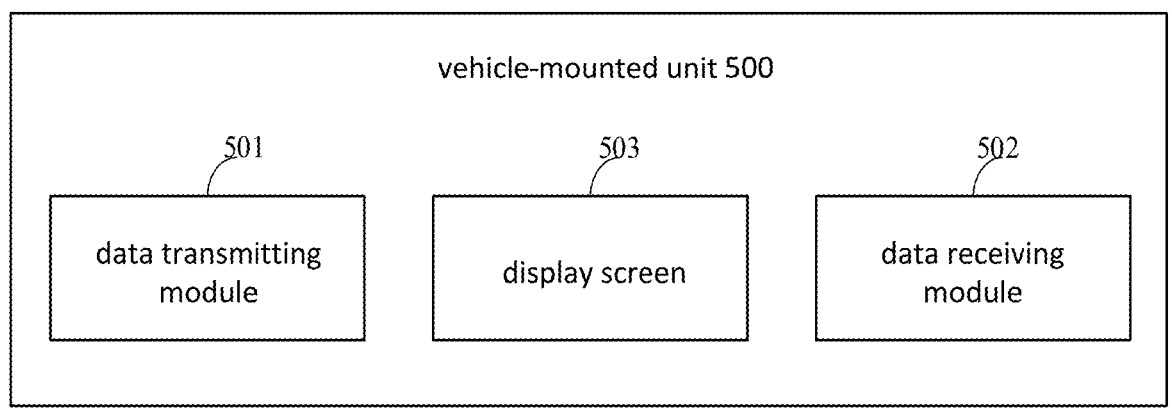
FIG. 6 is a block diagram of another vehicle-mounted unit according to an embodiment of the present disclosure.

In an embodiment, referring to FIG. 6, the vehicle-mounted unit 500 further includes a display screen 503. This display screen is configured to display road information.

In this embodiment, the identification code of the vehicle may be stored in the vehicle-mounted unit, so that each road screen unit may acquire, from the vehicle-mounted unit, the identification code generated by the first road screen unit for the vehicle, thereby reducing data processing volume of the second road screen unit and subsequent road screen units.

Figure 7:
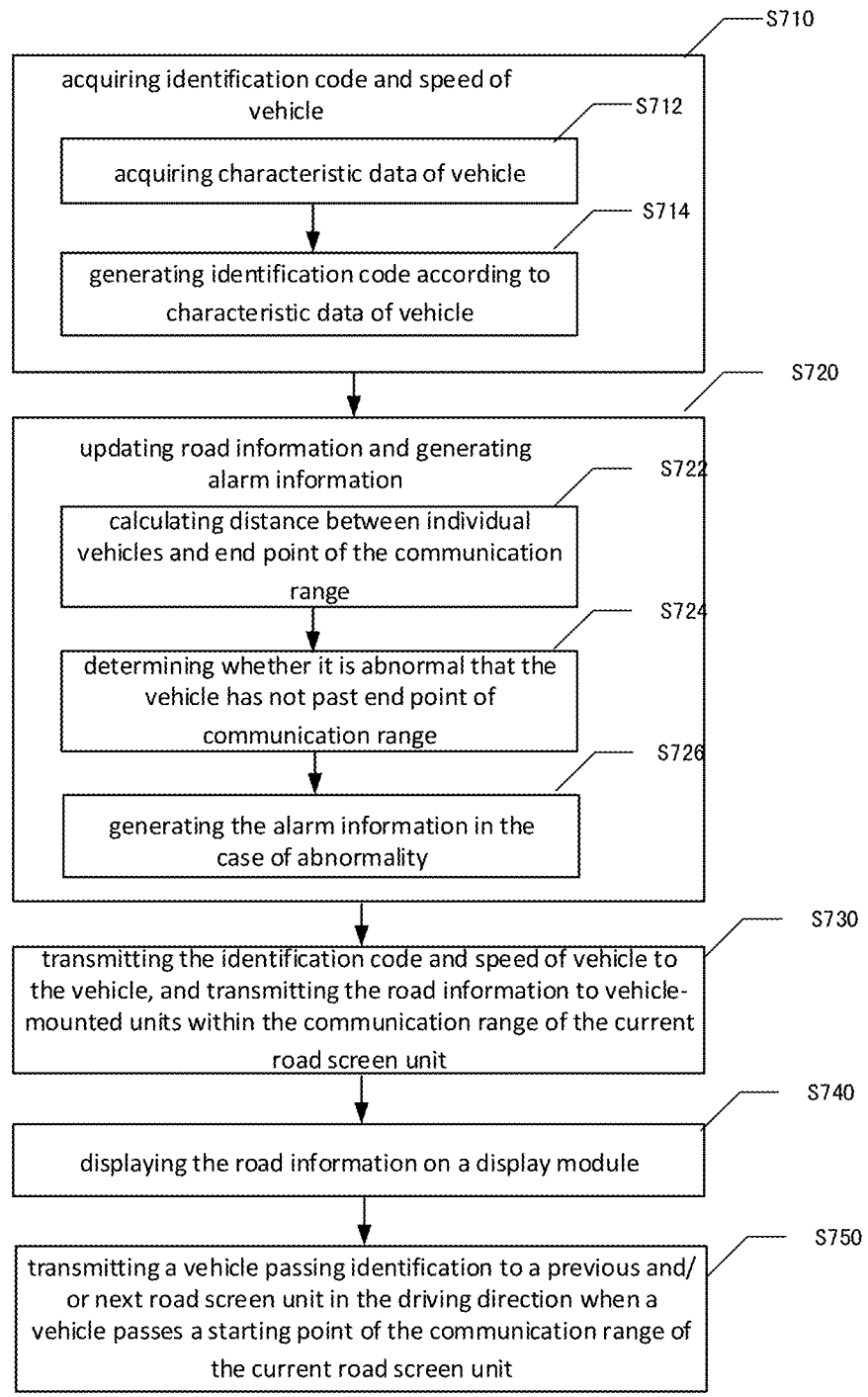
FIG. 7 is a flowchart of an operation method of a road screen networking system according to an embodiment of the present disclosure.

FIG. 7 is a flowchart of an operation method of a road screen networking system according to an embodiment of the present disclosure. The road screen networking system may be the road screen networking system shown in FIG. 1. As shown in FIG. 7, the operation method of the road screen networking system includes the following.

In step S710, when a vehicle enters the communication range of a current road screen unit, an identification code of the vehicle and a speed of the vehicle is acquired.

In step S720, road information is updated and alarm information is generated according to the speeds of individual vehicles within the communication range of the current road screen unit, the road information including at least relative distances between vehicles within the communication range of the current road screen unit.

In step S730: the identification code and the speed of the vehicle are transmitted to the vehicle, and the road information is transmitted to vehicle-mounted units within the communication range of the current road screen unit.

In step S710, acquiring the identification code of the vehicle may include step S712 of acquiring the characteristic data of the vehicle, and step S714 of generating the identification code according to the characteristic data of the vehicle.

In step S720, updating road information and generating alarm information according to the speeds of individual vehicles within the communication range of the current road screen unit includes: step S722 of calculating, for each vehicle within the communication range of the current road screen unit, a distance between the vehicle and an end point of the communication range of the current road screen unit according to the speed of the vehicle and a time point when the speed of the vehicle is acquired; step S724 of determining, based on the distance, whether it is abnormal that the vehicle has not passed the end point of the communication range of the current road screen unit; and step S726 of generating the alarm information in the case of abnormality.

As shown in FIG. 7, the operation method further includes step S740 of displaying the road information on the display module.

FIG. 7 also shows that the operation method further includes step S750 of transmitting a vehicle passing identification to a previous and/or next road screen unit in the driving direction when a vehicle passes a starting point of the communication range of the current road screen unit.

The following describes the work flow of the road screen networking system by taking the road screen networking system provided on a curve road as an example.

Figure 8:
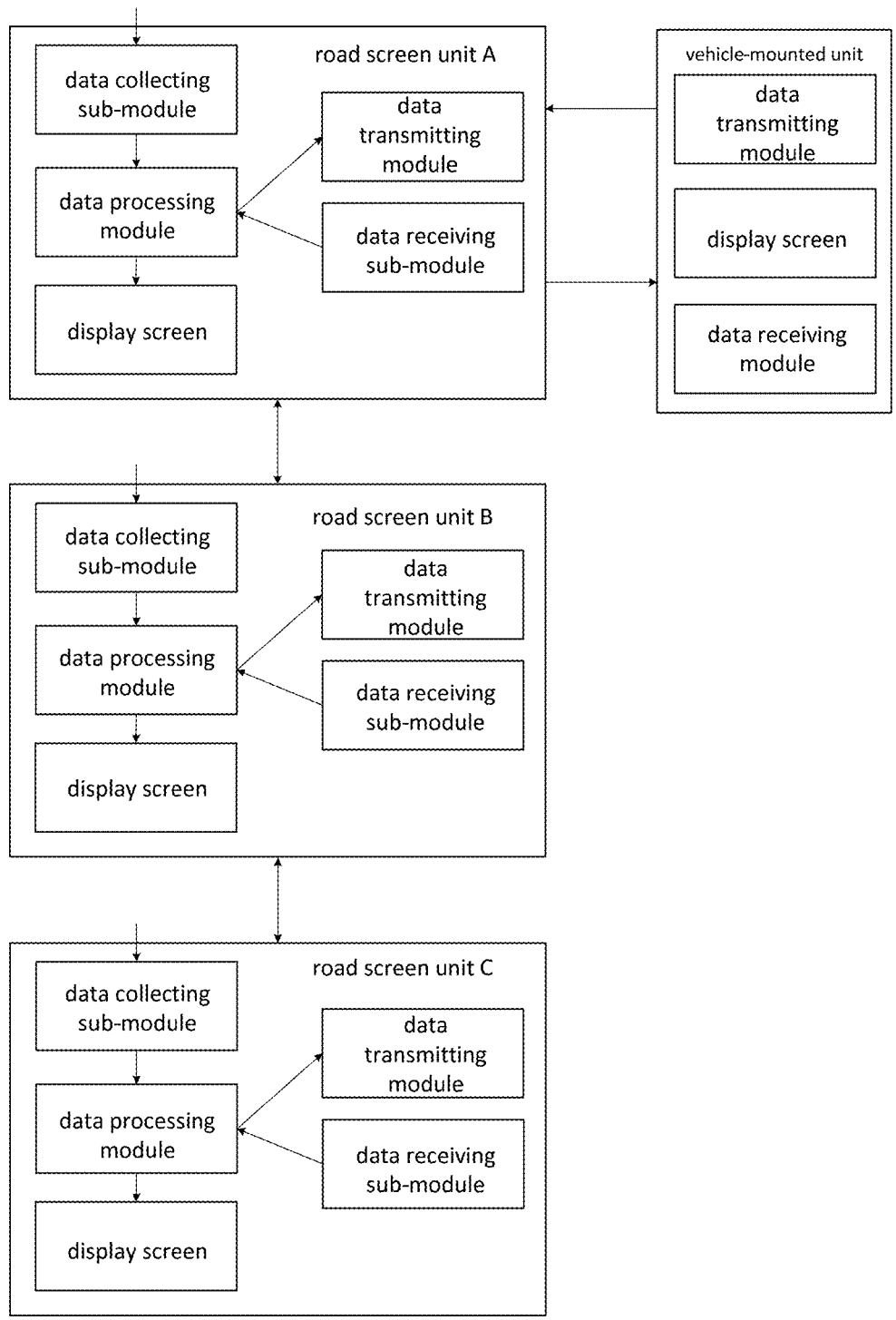
FIG. 8 is a diagram showing the interaction between the road screen networking system and the vehicle-mounted unit according to an embodiment of the present disclosure.
Figure 9:
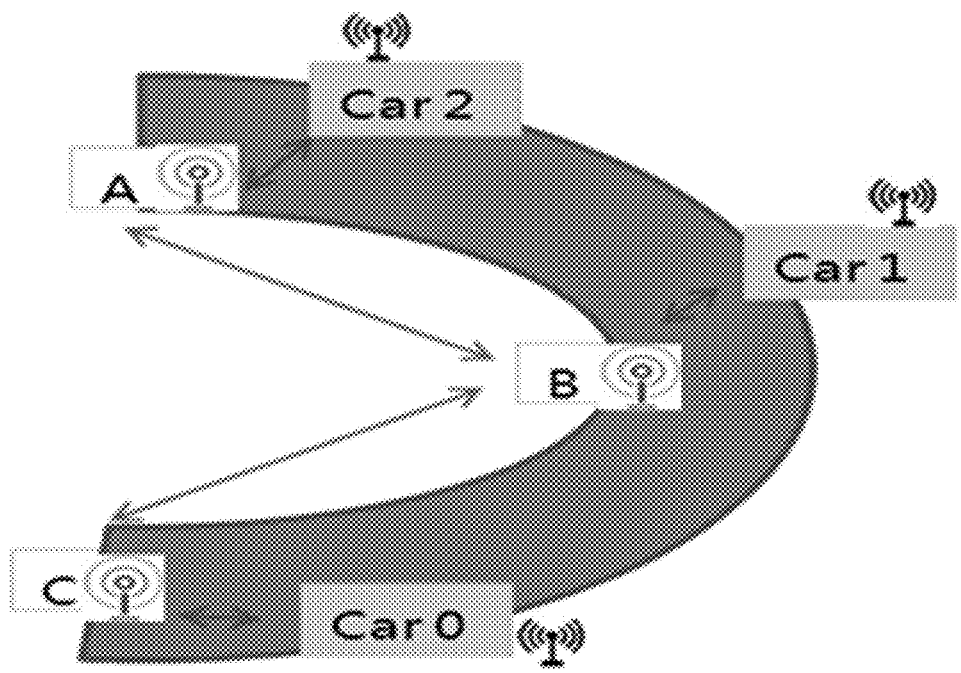
FIG. 9 is an application scenario diagram of a road screen networking system according to an embodiment of the present disclosure.

Referring to FIGS. 8 and 9, a road screen unit A, a road screen unit B, and a road screen unit C are provided at the curve road, and vehicles car0, car1, and ca2 are driven into the curve road. FIG. 8 shows the interaction between the road screen networking system and the vehicle-mounted unit, that is, the interaction between the road screen units A, B, and C and the vehicle-mounted units. The vehicle-mounted unit may be a vehicle-mounted unit provided on car0, car1, and car2.

Taking car2 as an example, referring to FIG. 9, when car2 passes the road screen unit A (that is, the starting point of the communication range of the road screen unit A), the data collecting sub-module in the road screen unit A collects the speed of car2, the current time point, and characteristic data of car2. The data processing module in the road screen unit A generates the identification code of car2, and updates the road information according to the speed of each vehicle (in this example, the vehicle Car1) within the communication range of the road screen unit A and the time point, for example, updates the location of car1 at this time according to the speed of car1. If car1 passes the road screen unit B, the road screen unit B transmits a vehicle passing identification to the road screen unit A and/or the road screen unit C. When receiving the vehicle passing identification, the road screen unit A considers that the vehicle car1 has passed the end point of the communication range of the road screen unit A, and the data processing module in the road screen unit A deletes car1 from the data about the communication range AB section. If car1 does not pass the road screen unit B, the road screen unit A calculates, based on the speed of car1 and the time point when the speed of car1 is acquired, the distance between car1 and the end point of the communication range of the road screen unit A (for example, at the road screen unit B), and determines whether it is normal that car1 has not passed the road screen unit B. If it is normal, the current position of car1 is calculated. If it is abnormal, the road screen unit A considers that car1 has stopped by default, and generates warning information. The display screen in the road screen unit A may display the current position of car1 or warning information. In one embodiment, according to road conditions, such as the curve road shown in FIG. 9, the road screen unit A may display the curve road on the display screen and identify the current position of car1 on the display screen.

The data transmitting module of the road screen unit A transmits the identification code and the speed of the vehicle to the vehicle-mounted unit on car2. The vehicle-mounted unit on car2 receives the identification code and the speed of the vehicle and registers it in the local memory. The data transmitting module of the road screen unit A also transmits road information to all vehicle-mounted units within the communication range of the road screen unit A, for example, the vehicle-mounted unit of car1 and the vehicle-mounted unit of car2. When the vehicle-mounted units of car1 and car2 receive the road information, they display the road information to the corresponding drivers through their respective displays respectively. In this way, when car2 passes the road screen unit A, car1 receives updated road information, from which it can know the distance to the following car2. Similarly, car2 receives the road information, from which it can know the distance to car1 in front. At the same time, the vehicle-mounted unit on car2 may transmit the identification code and the speed of the vehicle according to a preset period or in real time, so that when car2 passes the road screen unit B, the data receiving sub-module in the road screen unit B may receive the identification code and the speed of car2. In addition, the road screen unit B may be used as the end point of the communication range AB section to transmit the vehicle passing identification to the road screen unit A. At the same time, the road screen unit B may be used as the starting point of the communication range BC section. The operating principle of the road screen unit B is the same as that of the road screen unit A, and will not be repeated here.

In one embodiment, the road screen units communicate with each other so that when a certain road screen unit fails, the neighboring road screen units can know this situation, and cause the road screen networking system to operate normally by updating the communication ranges.

For example, in the example shown in FIG. 9, if the road screen unit B fails, it cannot transmit the vehicle passing identification to the road screen unit A when the vehicle cart) passes by. Through the communication between the road screen units, the road screen unit A knows that the road screen unit B fails, and that the next normal road screen unit is the road screen unit C. Similarly, the road screen unit C knows that the previous normal road screen unit is the road screen unit A. In this case, the road screen unit A expands its communication range to the range from the road screen unit A to the road screen unit C. Therefore, when Car2 passes the road screen unit A, the data processing module in the road screen unit A calculates the positions of car0, car1, and car2 on the section of the road from the road screen unit A to the road screen unit C, and transmits updated information to car0, car1, and car2.

In the present disclosure, the terms "first" and "second" are used for descriptive purposes only and cannot be understood as indicating or implying relative importance. The term "plurality" refers to two or more, unless expressly defined otherwise.

Those skilled in the art will easily think of other embodiments of the present disclosure after considering the description and practicing the disclosure disclosed herein. The present disclosure is intended to cover any variations, usage, or adaptive changes of the present disclosure that follow the general principles of the present disclosure and include common general knowledge or customary technical means in the technical field not disclosed in this disclosure. The description and embodiments are to be considered exemplary only, and the true scope and spirit of this disclosure are pointed out by the following claims.

It should be understood that the present disclosure is not limited to the precise structure that has been described above and shown in the drawings, and various modifications and changes may be made without departing from the scope thereof. The scope of the present disclosure is limited only by the appended claims.

I claim:

1. A road screen networking system, comprising a plurality of road screen units;
   wherein each road screen unit is configured to acquire information of vehicles within the respective road screen unit communication range and to provide the information to the vehicles within the communication range;
   wherein the communication range of each road screen unit is a range between the road screen unit and a next road screen unit in a driving direction;
   wherein each road screen unit comprises: a data acquisition module, a data processing module, and a data transmitting module;
   the data acquisition module is configured to acquire, when a vehicle enters the communication range of a current road screen unit, characteristic data of the vehicle and a speed of the vehicle; the characteristic data comprises vehicle characteristic information or an identification code;
   the data processing module is configured to generate the identification code of the vehicle by using an algorithm based on a color of the vehicle, a type of the vehicle, a number of the vehicle in all vehicles driving into the communication range, and a number of the vehicle in all vehicles currently within the communication range when there is no identification code in the characteristic data, and to update road information and generate alarm information according to the speeds of individual vehicles within the communication range of the current road screen unit, the road information comprises at least relative distances between vehicles within the communication range of the current road screen unit;
   the data transmitting module is configured to transmit the identification code and the speed of the vehicle to the vehicle that enters the communication range, and to transmit the road information to vehicle-mounted units within the communication range of the current road screen unit; and
   wherein the data processing module is configured to update road information and generate alarm information according to the speeds of individual vehicles within the communication range of the current road screen unit by operations comprising:
   calculating, for each vehicle within the communication range of the current road screen unit, a distance between the vehicle and an end point of the communication range of the current road screen unit according to the speed of the vehicle and a time point when the speed of the vehicle is acquired;
   determining, based on the distance, whether condition is normal or abnormal that the vehicle has not passed the end point of the communication range of the current road screen unit; and
   generating the alarm information if the condition is abnormal;
   wherein the data acquisition module comprises a data collecting sub-module and a data receiving sub-module;
   the data collecting sub-module is configured to acquire the characteristic data of the vehicle and the speed of the vehicle;
   the data receiving sub-module is configured to receive the identification code and the speed of the vehicle sent by the vehicle-mounted unit, which is installed inside a vehicle entering into the communication range of the current road screen unit from the communication range of a previous road screen unit in the driving direction;
   wherein the data receiving sub-module overrides the data collecting sub-module in acquiring the characteristic data of the vehicle and the speed of the vehicle if the receiving sub-module is able to receive the identification code within the characteristic data and the speed of the vehicle.

2. The road screen networking system of claim 1, wherein the road screen unit further comprises a display module, and the display module is configured to display the road information.

3. The road screen networking system of claim 1, wherein the data transmitting module is further configured to: when a vehicle passes a starting point of the communication range of the current road screen unit, transmit a vehicle passing identification to the data receiving sub-module of a previous road screen unit and a next road screen unit in the driving direction.

4. The road screen networking system of claim 3, wherein, if a vehicle passing identification transmitted by the data transmitting module of the next road screen unit in the driving direction is received, the vehicle corresponding to the vehicle passing identification is considered to have passed an end point of the communication range of the current road screen unit.

5. The road screen networking system of claim 1, wherein the road information further comprises road conditions within the communication range of the current road screen unit.

6. The road screen networking system of claim 1, wherein the data transmitting module is further configured to: when a vehicle passes a starting point of the communication range of the current road screen unit, transmit a vehicle passing identification to the data receiving sub-module of a previous road screen unit or a next road screen unit in the driving direction.

7. A vehicle-mounted unit installed on a vehicle and comprising a data transmitting module and a data receiving module;
wherein the data transmitting module is configured to transmit an identification code and a speed of the vehicle stored by the vehicle to a road screen unit; and
wherein the data receiving module is configured to receive the speed and identification code of the vehicle and road information from the road screen unit,
wherein each road screen unit comprises: a data acquisition module, a data processing module, and a data transmitting module;
the data acquisition module is configured to acquire, when the vehicle enters a communication range of a current road screen unit, characteristic data of the vehicle and the speed of the vehicle; the characteristic data comprises vehicle characteristic information or the identification code;
the data processing module is configured to generate the identification code of the vehicle by using an algorithm based on a color of the vehicle, a type of the vehicle, a number of the vehicle in all vehicles driving into the communication range, and a number of the vehicle in all vehicles currently within the communication range when there is no identification code in the characteristic data, and to update the road information and generate alarm information according to the speeds of individual vehicles within the communication range of the current road screen unit, the road information comprises at least relative distances between vehicles within the communication range of the current road screen unit;
the data transmitting module is configured to transmit the identification code and the speed of the vehicle to the vehicle that enters the communication range, and to transmit the road information to vehicle-mounted units within the communication range of the current road screen unit; and
wherein the data processing module is configured to update road information and generate alarm information according to the speeds of individual vehicles within the communication range of the current road screen unit by operations comprising:
calculating, for each vehicle within the communication range of the current road screen unit, a distance between the vehicle and an end point of the communication range of the current road screen unit according to the speed of the vehicle and a time point when the speed of the vehicle is acquired;
determining, based on the distance, whether condition is normal or abnormal that the vehicle has not passed the end point of the communication range of the current road screen unit; and generating the alarm information if the condition is abnormal;
wherein the data acquisition module comprises a data collecting sub-module and a data receiving sub-module;
the data collecting sub-module is configured to acquire the characteristic data of the vehicle and the speed of the vehicle;
the data receiving sub-module is configured to receive the identification code and the speed of the vehicle sent by the vehicle-mounted unit, which is installed inside a vehicle entering into the communication range of the current road screen unit from the communication range of a previous road screen unit in the driving direction;
wherein the data receiving sub-module overrides the data collecting sub-module in acquiring the characteristic data of the vehicle and the speed of the vehicle if the receiving sub-module is able to receive the identification code within the characteristic data and the speed of the vehicle.

8. The vehicle-mounted unit of claim 7, further comprising a display module configured to display the road information.

* * * * *